US010134286B1

(12) United States Patent
Elswick et al.

(10) Patent No.: US 10,134,286 B1
(45) Date of Patent: Nov. 20, 2018

(54) SELECTING VEHICLE PICKUP LOCATION

(71) Applicant: GM GLOBAL TECHNOLOGY OPERATIONS LLC, Detroit, MI (US)

(72) Inventors: Richard Elswick, Warren, MI (US); Aditya S. Kamini, Bloomfield Hills, MI (US); Nathaniel H. Williams, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/716,060

(22) Filed: Sep. 26, 2017

(51) Int. Cl.
| G08G 1/00 | (2006.01) |
| G06K 9/00 | (2006.01) |
| H04W 4/04 | (2009.01) |
| G06Q 50/30 | (2012.01) |
| G08G 1/0968 | (2006.01) |
| G06Q 10/02 | (2012.01) |

(52) U.S. Cl.
CPC ......... *G08G 1/205* (2013.01); *G06K 9/00825* (2013.01); *G06Q 10/02* (2013.01); *G06Q 50/30* (2013.01); *G08G 1/096883* (2013.01); *H04W 4/046* (2013.01)

(58) Field of Classification Search
CPC .. G08G 1/205; G08G 1/096883; G08G 1/143; G06K 9/00825; G06Q 10/02; G06Q 50/30; H04W 4/046
See application file for complete search history.

(56) References Cited

U.S. PATENT DOCUMENTS

| 8,589,065 | B2 * | 11/2013 | Scofield | G01C 21/3685 |
| | | | | 340/932.2 |
| 9,330,570 | B2 * | 5/2016 | Wang | G08G 1/147 |
| 9,679,485 | B2 * | 6/2017 | Bostick | G08G 1/143 |
| 2012/0188100 | A1 * | 7/2012 | Min | G08G 1/143 |
| | | | | 340/932.2 |
| 2017/0076603 | A1 * | 3/2017 | Bostick | B62D 15/0285 |
| 2017/0091856 | A1 * | 3/2017 | Canberk | G06Q 30/0645 |
| 2017/0141873 | A1 * | 5/2017 | Mandeville-Clarke | |
| | | | | H04K 3/90 |
| 2017/0236418 | A1 * | 8/2017 | Bostick | G08G 1/143 |
| | | | | 340/932.2 |
| 2017/0267233 | A1 * | 9/2017 | Minster | B60W 30/06 |

(Continued)

FOREIGN PATENT DOCUMENTS

WO WO 2015106867 A1 * 7/2015 ........... B62D 15/027

*Primary Examiner* — Steven Lim
*Assistant Examiner* — Mancil Littlejohn, Jr.
(74) *Attorney, Agent, or Firm* — David Willoughby; Reising Ethington P.C.

(57) ABSTRACT

A system and method of enabling a user to select a location for vehicle pickup, wherein the method is carried out by a handheld mobile device, and wherein the method includes: obtaining vehicle reservation information pertaining to a vehicle reservation, wherein the vehicle reservation information includes a reservation start location; displaying a camera feed on a visual display of the mobile device, wherein the camera feed is video data that is obtained by a camera included on the mobile device; receiving a vehicle pickup selection from a user, wherein the vehicle pickup selection is generated by a user selecting an area for pickup that is within a field of view of the camera; and sending a vehicle pickup selection message to the remote server, wherein the vehicle pickup selection message includes the vehicle pickup selection.

15 Claims, 5 Drawing Sheets

(56) References Cited

U.S. PATENT DOCUMENTS

2017/0308817 A1* 10/2017 Miller .................... G06Q 10/02
2017/0343375 A1* 11/2017 Kamhi ............... G01C 21/3407
2017/0344010 A1* 11/2017 Rander ............. G01C 21/3438
2017/0370734 A1* 12/2017 Colijn .................. G01C 21/343

* cited by examiner

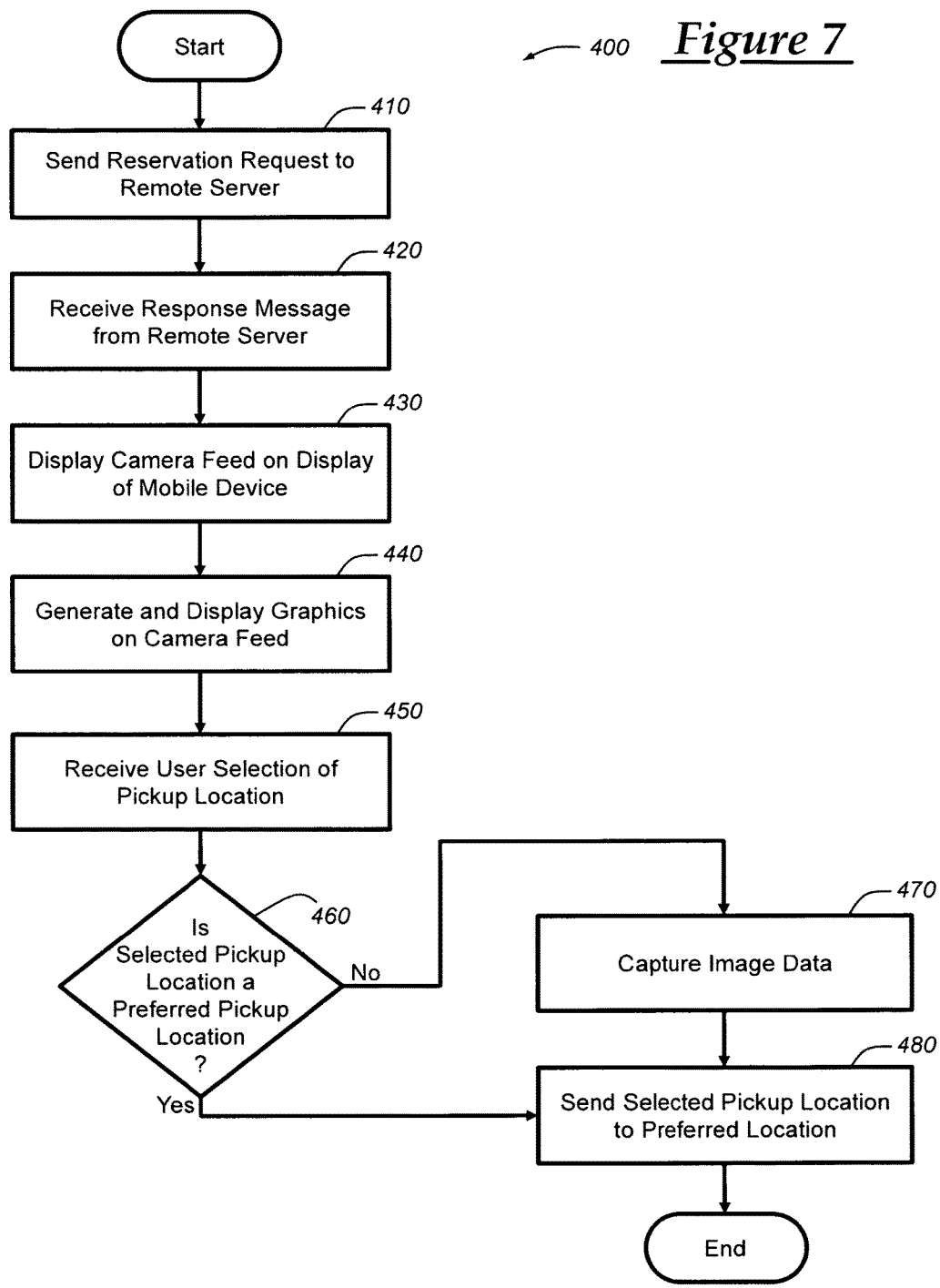

SELECTING VEHICLE PICKUP LOCATION

The disclosure relates to assisting a user in selecting a pickup location for the start of a vehicle reservation.

Many electronic devices and network systems can be used to implement myriad services and provide numerous functionality to users. Such electronic devices can be incorporated into vehicles and can be used to provide the vehicle certain services and/or information. Also, vehicle information, such as the vehicle's location, can be sent from the vehicle to a remote server or database, and from a remote server to a mobile device. The remote network, which can include servers and databases, can use remote network communications, such as via TCP/IP, to provide the vehicle and vehicle users various services, such as providing a car sharing service. Additionally, handheld mobile devices, such as smartphones, can be used in conjunction with such services and may be used to provide a user of the handheld mobile device information pertaining to the vehicle and/or information pertaining to a location at which the vehicle is located.

SUMMARY

According to a first embodiment, there is provided a method of enabling a user to select a location for vehicle pickup, wherein the method is carried out by a handheld mobile device, and wherein the method includes: obtaining vehicle reservation information pertaining to a vehicle reservation, wherein the vehicle reservation information includes a reservation start location; displaying a camera feed on a visual display of the mobile device, wherein the camera feed is video data that is obtained by a camera included on the mobile device; receiving a vehicle pickup selection from a user, wherein the vehicle pickup selection is generated by a user selecting an area for pickup that is within a field of view of the camera; and sending a vehicle pickup selection message to the remote server, wherein the vehicle pickup selection message includes the vehicle pickup selection.

According to other embodiments, there is provided that of the first embodiment further including any one or more of the following:
- the step of sending a vehicle reservation request to a remote server, wherein the vehicle reservation request is used to generate a reservation of a vehicle, wherein the vehicle reservation request specifies or includes the reservation start location, and wherein the reservation start location is a present location of the user or a general location in which the user has specified as a start location for the reservation;
- the step of receiving a pickup location response message from the remote server, wherein the pickup location response message includes identifying information of one or more preferred pickup locations, and wherein the identifying information includes one or more visual cues identifying the one or more preferred pickup locations;
- the step of, for each of the one or more preferred pickup locations, identifying a corresponding area of the camera feed that corresponds with the preferred pickup location based on the associated visual cue(s);
- the step of, for each of the one or more preferred pickup locations, displaying a graphic over the camera feed in the corresponding area of the camera feed;
- wherein the vehicle pickup selection corresponds to one of the preferred pickup locations;
- wherein the remote facility is configured to send a vehicle pickup guidance message to the vehicle, wherein the vehicle pickup guidance message includes visual information of the selected pickup location, and wherein the vehicle is configured to: capture image data of an area in front of the vehicle; and compare the captured image data of the area in front of the vehicle to the visual information to guide the vehicle to the selected pickup location;
- the step of, in response to the receiving step, capturing image data using the camera;
- wherein the vehicle pickup selection message includes the captured image data;
- wherein the remote server is configured to: receive the vehicle pickup selection message; and in response to receiving the vehicle pickup selection message, send a vehicle pickup guidance message to the vehicle;
- wherein the vehicle pickup guidance message includes the captured image data and wherein the vehicle is configured to use the captured image data to identify the selected pickup location through comparing the received image data to image data obtained by one or more cameras installed on the vehicle; and/or
- wherein the vehicle is an autonomous vehicle that is configured to autonomously drive to the selected pickup location upon receiving a message that includes information used to identify the selected pickup location.

According to a second embodiment, there is provided a method of enabling a user to select a location for vehicle pickup, wherein the method is carried out by a handheld mobile device, and wherein the method includes: sending a vehicle reservation request to a remote server, wherein the vehicle reservation request is used to generate a reservation of a vehicle, wherein the vehicle reservation request specifies or includes a reservation start location, and wherein the reservation start location is a present location of the user or a general location in which the user would like to be picked up by the vehicle; after sending the vehicle reservation request, receiving a pickup location response message from the remote server, wherein the pickup location response message includes identifying information of one or more preferred pickup locations, and wherein the identifying information includes one or more visual cues identifying the one or more preferred pickup locations; displaying a camera feed on the visual display of the mobile device, wherein the camera feed is video data that is obtained by a camera included on the mobile device; for each of the one or more preferred pickup locations, identifying a corresponding area of the camera feed that corresponds with the preferred pickup location based on the associated visual cue(s); for each of the one or more preferred pickup locations, displaying a graphic over the camera feed in the corresponding area of the camera feed; receiving a vehicle pickup selection from a user, wherein the vehicle pickup selection is generated by a user selecting an area for pickup that is within a field of view of the camera; and sending a vehicle pickup selection message to the remote server, wherein the vehicle pickup selection message includes the vehicle pickup selection.

According to other embodiments, there is provided that of the second embodiment further including any one or more of the following:
- wherein the vehicle pickup selection corresponds to one of the preferred pickup locations;
- wherein the remote facility is configured to send a vehicle pickup guidance message to the vehicle, wherein the vehicle pickup guidance message includes visual information of the selected pickup location, and wherein the vehicle is configured to: capture image data of an area in front of the vehicle; and compare the captured image data of the area in front of the vehicle to the visual information to guide the vehicle to the selected pickup location;

the step of, in response to receiving the vehicle pickup selection from the user, capturing image data using the camera, and wherein the vehicle pickup selection message includes the captured image data;

wherein the remote server is configured to: receive the vehicle pickup selection message; and send a vehicle pickup guidance message to the vehicle;

wherein the vehicle pickup guidance message includes at least part of the captured image data and wherein the vehicle is configured to use the received image data to identify the selected pickup location through comparing the received image data to image data obtained by one or more cameras installed on the vehicle; and/or wherein the vehicle is an autonomous vehicle that is configured to autonomously drive to the selected pickup location upon receiving a message that includes information used to identify the selected pickup location.

According to a third embodiment, there is provided a method of enabling a user to select a location for vehicle pickup, wherein the method comprises: receiving a vehicle reservation request, wherein the vehicle reservation request specifies a vehicle for reservation or wherein a vehicle is assigned to fulfill the reservation, wherein the reservation request specifies or includes a reservation start location, and wherein the reservation start location is a present location of the user or a general location in which the user would like to be picked up by the vehicle; receiving image data from the mobile device of the user, wherein the image data includes one or more images of an area surrounding or at a selected pickup location; and sending the image data to a vehicle, wherein the vehicle is configured to identify the selected pickup location through comparing the received image data to image data obtained by one or more cameras installed on the vehicle.

BRIEF DESCRIPTION OF THE DRAWINGS

Exemplary embodiments will hereinafter be described in conjunction with the appended drawings, wherein like designations denote like elements, and wherein:

FIG. 7 is a flowchart illustrating another embodiment of a method of enabling a user to select a location for vehicle pickup.

DETAILED DESCRIPTION

The system and methods below enable a user to select a location for vehicle pickup. In some embodiments, the system and methods can be used to identify preferred pickup locations on a user's handheld mobile device through overlaying graphics onto a camera feed thereby providing an augmented reality view of the user's environment. Other embodiments provide for the capturing of image data by the mobile device and sending of the image data to a vehicle that then can use the image data to guide itself to the selected pickup location. Many embodiments of the method generally include: displaying a camera feed on a display of a handheld device; receiving preferred pickup location information; displaying graphics corresponding to the preferred pickup locations; and allowing a user of the mobile device to select one of the preferred pickup locations as a location in which the vehicle will be directed to pick up the user to start the reservation.

In some scenarios, a vehicle reservation request may specify a reservation start location for the reservation and, in some cases, the start location may be an address (e.g., 1234 Main St., City, State). The address may correspond to a large plot of land or may correspond to a very crowded area and, in such instances, coordinating the precise location for vehicle pickup may increase user experience and/or help facilitate traffic flow. The method discussed herein can be used to help coordinate and/or facilitate the vehicle pickup process between the user and the vehicle.

Figure 1:
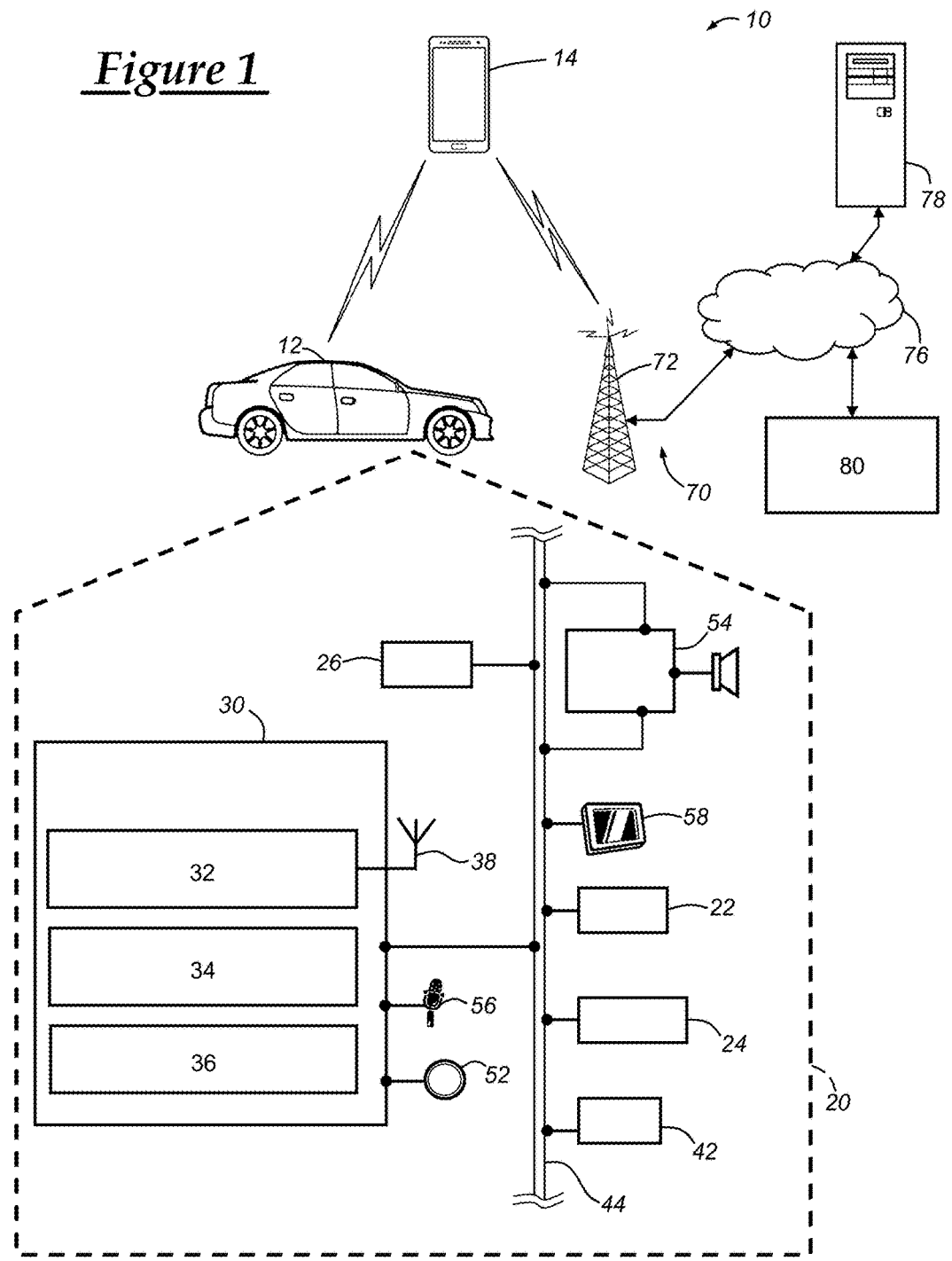
FIG. 1 is a block diagram depicting an embodiment of a communications system that is capable of utilizing the method disclosed herein.

Referring now to FIG. 1, there is shown an operating environment that comprises a communications system 10 and that can be used to implement the method disclosed herein. Communications system 10 generally includes a vehicle 12 with a wireless communications device 30, a handheld mobile device 14, one or more wireless carrier systems 70, a land communications network 76, a computer 78, and a remote facility 80. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicles 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicles 12 or handheld mobile device 14. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, handheld mobile device 14, remote facility 80, or any combination thereof. A computer 78 can also be used for providing Internet connectivity such as DNS services or as a network address server that uses DHCP or other suitable protocol to assign IP addresses to the vehicles 12 or handheld mobile device 14.

In one embodiment, computers 78 can provide information for use in a mobile application that can be executed by the vehicle or a handheld device. The information provided to the mobile application can be information pertaining to the vehicle, the operator, and/or the location of the mobile device or vehicle. For example, the computers 78 can receive a request from the mobile application for particular information, such as for a vehicle reservation request that specifies a reservation start location of the reservation, as will be discussed more below.

Remote facility 80 may be designed to provide the vehicle electronics 20 (discussed below) and handheld mobile device 14 with a number of different system back-end functions. For example, remote facility 80 may be used in part to implement a car sharing service or a vehicle reservation service. In such a case, remote facility 80 may coordinate reservations of vehicles, store data pertaining to the reservations or other aspects of the car sharing service, and/or provide authentication and authorization data to SRWC devices (e.g., handheld mobile device 14), users, and/or vehicles. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. It will be appreciated that the remote facility can utilize a live advisor or an automated VRS or, a combination of the VRS and the live advisor can be used. The remote facility 80 or computer 78 can include numerous servers and databases that can be used in conjunction with one or more steps of certain embodiments of the method discussed herein. In such embodiments, the remote facility 80 or computer 78 can store vehicle information in one or more databases (or memory devices) and can communicate with a vehicle-sharing application on the handheld mobile device 14, as discussed in more detail below.

In one embodiment, a remote server (e.g., a server at remote facility 80 or a computer 78) can include a vehicle car sharing system that can coordinate vehicle reservations and/or ride sharing. The remote server may be configured to communicate with a plurality of client devices (e.g., handheld mobile device 14, a client computer) and with a plurality of vehicles (e.g., vehicle 12). The remote server can include or obtain information pertaining to the vehicles, such as reservation schedule/availability and vehicle location. The remote server can also include preferred pickup locations that correspond to certain geographical locations and that can be used to facilitate the vehicle pickup process, as will be explained in more detail below.

Vehicle 12 (only one is shown in FIG. 1) is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. In some embodiments, vehicle 12 can be an autonomous or semi-autonomous vehicle that is capable of driving itself between certain locations. Some of the vehicle electronics 20 are shown generally in FIG. 1 and includes a wireless communications device 30, a GNSS module 22, camera(s) 24, sensor(s) 26, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE, and/or IEEE standards and specifications, to name but a few.

The vehicle 12 can include numerous vehicle system modules (VSMs) as part of vehicle electronics 20, such as the GNSS module 22, camera(s) 24, sensor(s) 26, wireless communications device 30, and vehicle user interfaces 52-58, as will be described in detail below. The vehicle 12 can also include other VSMs 42 in the form of electronic hardware components that are located throughout the vehicle and which may receive input from one or more sensors and use the sensed input to perform diagnostic, monitoring, control, reporting, and/or other functions. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Wireless communications device 30 is capable of communicating data via short-range wireless communications (SRWC) or via cellular communications. As shown in the exemplary embodiment of FIG. 1, wireless communications device 30 includes a wireless chipset 32, a processor 34, memory 36, and one or more antennas 38 (only one is shown for illustrative purposes). Also, wireless communications device 30 can be directly connected to one or more vehicle user interfaces, such as microphone 56 and/or pushbutton 52. In one embodiment, wireless communications device 30 may be a standalone module or, in other embodiments, device 30 may be incorporated or included as a part of one or more other vehicle system modules, such as a center stack module (CSM), a body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth™ Low Energy (BLE), or near field communication (NFC). The short-range wireless communication circuit or chipset 32 enables the wireless communications device 30 to transmit and receive SRWC, such as BLE. The SRWC circuit may allow the device 30 to connect to another SRWC device. As used herein, a short-range wireless communications (SRWC) device is a device capable of SRWC. Additionally, in many embodiments, the wireless communications device may contain a cellular chipset thereby allowing the device to communicate via one or more cellular protocols, such as those used by cellular carrier system 70. In other embodiments, a separate telematics unit can be provided and used to carry out cellular communications.

The vehicle may use the wireless communications device 30 to detect other SRWC devices, such as handheld mobile device 14. A connection between the wireless communications device 30 and one or more devices 14 may allow for the operation of various vehicle-device functionality, and may be established when the handheld mobile device 14 comes within a predetermined distance of the vehicle such that it may connect with the vehicle via SRWC. Vehicle-device functionality refers to any function of the vehicle that may be complimented, improved, supported, or carried out through a handheld mobile device; any function of the handheld mobile device that may be complimented, improved, supported, or carried out through the vehicle; or any other function that may be carried out using the vehicle and one or more handheld mobile devices. For example, vehicle-device functionality can include using the handheld mobile device to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the handheld mobile device with hands-free calling, such as through use of vehicle-user interfaces to place, receive, and carry out voice calls; sending information to the handheld mobile device, such as geographical information to the handheld mobile device (such as information obtained from the GNSS module 22) or vehicle diagnostic information or codes; and carrying out commands received at the vehicle from the handheld mobile device.

The communications between the vehicle and the handheld mobile devices may allow for functionality of the device 14 to be used by the vehicle electronics 20, or vice versa. For example, in the case where the handheld mobile device is a cellular-enabled smartphone, received calls at the smartphone may be carried out through the audio system 54 and/or through use of microphone 56 of the vehicle electronics 20. This may be done so through the phone sending received audio data or signals to the wireless communications device 30, which then may use bus 44 to send the audio signals to audio system 54. Likewise, video received at the smartphone 14 may be sent to the visual display 58 via the wireless communications device 30. Also, audio received at microphone 56 in the vehicle electronics may be sent to the smartphone 14 via wireless communications device 30.

Wireless communications device 30 may be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. Memory 36 may include RAM, other temporary powered memory, any non-transitory computer-readable medium (e.g., EEPROM), or any other electronic computer medium that stores some or all of the software needed to carry out the various external device functions discussed herein.

Global Navigation Satellite System (GNSS) module 22 receives radio signals from a constellation of GNSS satellites (not shown). From these signals, the module 22 can determine vehicle position which may enable the vehicle to determine whether it is at a known location, such as home or workplace. In one embodiment, GNSS module 22 can be a global positioning system (GPS) module that receives radio signals from a constellation of GPS satellites. Moreover, GNSS module 22 can provide this location data to wireless communications device 30, which can then use this data to identify known locations, such as a vehicle operator's home or workplace, as well as to carry out the method described herein. Additionally, GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit. And, in some embodiments, the vehicle 12 may use the GNSS module and other navigation systems to autonomously drive itself between locations. Other satellite navigation systems may be used as well.

In one embodiment, the vehicle 12 can receive a pickup location from a remote server and, using the GNSS module 22 and vehicle navigation system, the vehicle 12 can guide the operator to drive the vehicle to the pickup location. In another embodiment, the vehicle 12 may be an autonomous vehicle and can drive to the pickup location through use of the GNSS module 22 and vehicle navigation system.

Cameras 24 (only one shown) may be digital cameras that are incorporated into vehicle 12 and that digitally capture images and videos surrounding the vehicle, such as areas located in the rear of the vehicle, to the sides of the vehicle, and/or in front of the vehicle. In one embodiment, multiple cameras 24 may be located on vehicle 12 such that the cameras can capture images or video of the same area or at least part of the same area. In yet another embodiment, a stereo camera (or stereoscopic camera) or other camera with multiple lenses or separate image sensors may be used. In either of such embodiments, the camera(s) may be used to capture more information pertaining to the captured area, such as three-dimensional characteristics (e.g., distances of objects in the captured area), as will be known by those skilled in the art.

In some embodiments, the images or video captured by the camera 24 may be immediately displayed on visual display 58 thereby allowing the user to view the area that is being captured by the camera on the display. In addition, the cameras may each include a camera flash (not shown). Also, the camera or video feed may be streamed to another device, such as handheld mobile device 14, computers 78, or a server at remote facility 80.

In another embodiment, the vehicle can be configured to receive image data from a remote server and to use the image data to identify an area or location (e.g., a selected pickup location) through comparing the received image data to image data obtained by one or more cameras 24 installed on the vehicle. For example, the vehicle can use cameras 24 to obtain images of an area in front of the vehicle and, through comparing these obtained images with image data received from the remote facility, the vehicle can identify an area in the field of view of the camera 24 that corresponds to the received image data. In one embodiment, this received image data may correspond to a selected pickup location and, upon recognizing this, the vehicle may then navigate to the selected pickup location or inform an operator of the selected pickup location.

Sensors 26 (only one shown) can be any vehicle sensors known to those skilled in the art and can include: vehicle speed or wheel speed sensors, steering wheel angle sensors, brake sensors, ignition sensors, transmission sensors, torque sensor, positional sensors (e.g., to measures yaw or pitch), throttle position sensors, etc. In one embodiment, the vehicle can obtain sensor data and use this data to aid the vehicle reservation application, such as through using these sensors to guide an autonomous vehicle to the selected pickup location.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Figure 2:
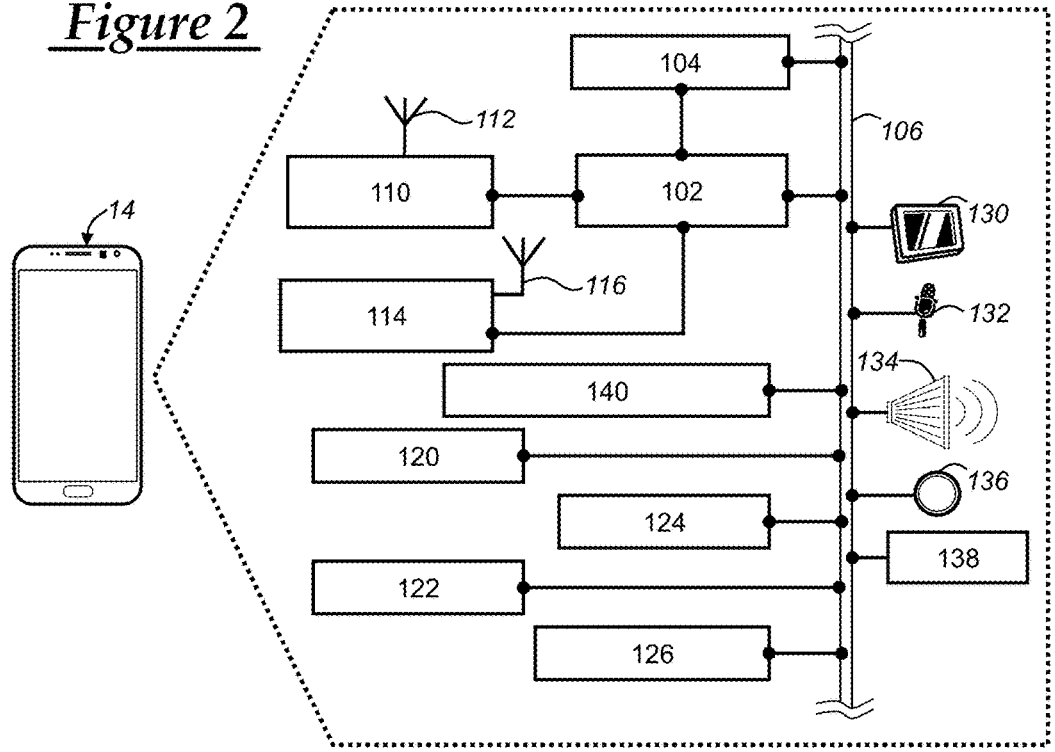
FIG. 2 is a block diagram depicting an embodiment of a handheld mobile device and illustrates some hardware and components of the handheld mobile device.
Figure 3:
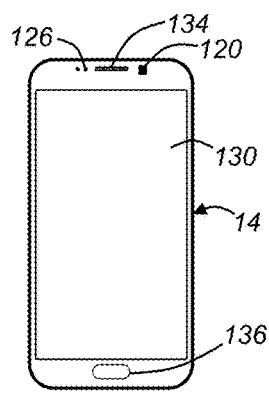
FIG. 3 is a block diagram depicting a front view of the handheld device of FIG. 2 where the device is depicted as front-facing.
Figure 4:
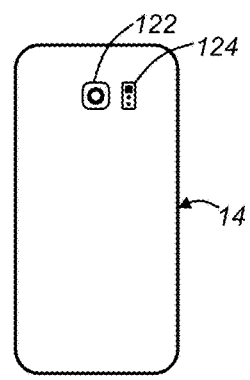
FIG. 4 is a block diagram depicting a rear view of the handheld device of FIG. 2 where the device is depicted as rear-facing.

With reference to FIGS. 2-4, there is shown a schematic view of the hardware and components of a handheld mobile device 14 (FIG. 2), along with a front view (FIG. 3) and a back view (FIG. 4) of a handheld mobile device 14. Device 14 is shown as a smartphone having cellular telephone capabilities; however, in other embodiments, device 14 may be a tablet, a wearable electronic device (e.g., a smartwatch or an electronic ocular device), or any other suitable device. As used herein, a handheld mobile device is a device that is capable of network communications and that is portable by a user, such as a wearable device (e.g., a smartwatch), an implantable device, or a handheld device (e.g., a smartphone, a tablet, a laptop). The mobile device includes: hardware, software, and/or firmware enabling cellular telecommunications and/or short range wireless communications (SRWC), as well as other wireless device functions and applications. The hardware of mobile device 14 comprises a processor 102, memory 104, wireless chipsets/circuits 110, 114, antennas 112,116, cameras 120,122, GNSS module 138, accelerometer 140, and various user-device interfaces.

Processor 102 can be any type of device capable of processing electronic instructions and can execute such instructions that may be stored in memory 104, such as those devices and types of instructions discussed above with respect to processor 32 in wireless communications device 30. For instance, processor 102 can execute programs or process data to carry out at least a part of the method discussed herein. The processor may also execute an operating system for the handheld device, such as Android™, iOS™ Microsoft™ Windows™, and/or other operating systems. The operating system may provide a user interface and a kernel, thereby acting as a central control hub that manages the interfacing between the hardware and software of the device. Moreover, the operating system may execute mobile applications, software programs, and/or other software or firmware instructions. In one embodiment, the processor can execute a vehicle-sharing or vehicle-reservation application that enables a user to make vehicle reservations or to coordinate ride sharing, and to assist a user in locating potential pickup locations.

Memory 104 may include RAM, other temporary powered memory, any non-transitory computer-readable medium (e.g., EEPROM), or any other electronic computer medium that stores some or all of the software needed to carry out the various external device functions discussed herein. In other embodiments, memory 104 may be a non-volatile memory card, such as a Secure Digital™ (SD) card, that is inserted into a card slot of device 14.

The processor 102 and/or memory 104 may be connected to a communications bus 106, which allows for the communication of data between the processor and other components of the device 14, such as cameras 120,122, camera flash 124, LED indicator 126, visual display 130, microphone 132, speaker 134, pushbutton 136, GNSS module 138, accelerometer 140, and various other components. The processor 102 may provide processing power for such components and/or may, through the operating system, coordinate functionality of the components, while the memory 104 may allow for storage of data that may be usable by such components. For example, the processor may run the primary operating system for the device 14, which may include displaying a graphical user interface (GUI) on a touchscreen display 130. In such an example, the GUI may include the display of images that may be stored in memory 104. The mobile device processor and software stored in the memory also enable various software applications, which may be preinstalled or installed by a user or by a manufacturer. This may include an application (e.g., the vehicle-reservation application) that can allow the device 14 to provide visual cues or other visual information to a vehicle operator such that the vehicle can drive the vehicle to a designated or particular area, such as a particular pickup location. The vehicle-reservation application can be used with remote computer 78, remote facility 80, and/or vehicle 12. This vehicle-reservation application may use one or more of the components of the device 14, such as display 130, front-facing camera 120, rear-facing camera 122, GNSS module 138, accelerometer 140, and speaker 134, as will be discussed in more detail below.

The handheld mobile device 14 includes a short range wireless communications (SRWC) circuit 110 and SRWC antenna 112, which allows it to carry out SRWC, such as any of the IEEE 802.11 protocols, WiMAX™, ZigBee™, Wi-Fi Direct™, Bluetooth™ Bluetooth™ Low Energy (BLE), or near field communication (NFC). The SRWC circuit may allow the device 14 to connect to another SRWC device.

Additionally, handheld mobile device 14 contains a cellular chipset 114 thereby allowing the device to communicate via one or more cellular protocols, such as GSM/GPRS technology, CDMA or CDMA2000 technology, and LTE technology. Device 14 may communicate data over wireless carrier system 70 using the chipset 114 and cellular antenna 116. Although the illustrated embodiment depicts a separate chipset and antenna for SRWC and cellular communications chipsets, in other embodiments, there may be a single antenna for both chipsets, a single chipset and multiple antennas, or both a single chipset and a single antenna. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Global Navigation Satellite System (GNSS) module 138 receives radio signals from a constellation of GNSS satellites 60 (FIG. 1). From these signals, the module 138 can determine the position of the handheld mobile device 14, which may enable the device to determine whether it is at a known location, such as home or workplace. Or, the position information can be used to specify a reservation start location of the user, which can then be used to narrow down the potential pickup locations for the reservation. In one embodiment, GNSS module 138 can be a global positioning system (GPS) module that receives radio signals from a constellation of GPS satellites. The GNSS module 138 may be similar to the GNSS module 22 provided in the vehicle electronics, and may provide similar functionality to the mobile device 14.

Cameras 120 and 122 may be digitals cameras that are incorporated into device 14 and that enable device 14 to digitally capture images and videos. As shown in FIG. 3, camera 120 may be a front-facing camera, meaning that the camera faces an area in front of the front-side of the device 14, the front side being, in many embodiments, the side with the main visual display. Since an operator of a device 14 generally holds or positions such a device so that the visual display is in view, camera 120 in such an arrangement may face the operator, thereby allowing the operator to capture images and/or video of the operator (e.g., selfies) and/or behind and surrounding the operator. As shown in FIG. 4, camera 122 is a rear-facing camera, meaning that the camera faces an area away from the front side of the device. Thus, in such an arrangement of usual use of the mobile device as described above, the camera may capture images or video of an area in front of the operator. In one scenario, the mobile device 14 can be mounted on a vehicle dashboard (or elsewhere on the vehicle) in a manner such that the visual display 130 faces a vehicle operator and such that the rear-facing camera captures images or video from an area in front of the vehicle. In such a scenario, the device 14 can execute the vehicle-reservation application that can be used to present the user with preferred pickup locations and to allow the user to select a particular pickup location.

In another embodiment, multiple cameras may be located on the handheld mobile device 14 such that the cameras can capture images or video of the same area or at least part of the same area. In yet another embodiment, a stereo camera (or stereoscopic camera) or other camera with multiple lenses or separate image sensors may be used. In either of such embodiments, the camera(s) may be used to capture more information pertaining to the captured area, such as three-dimensional characteristics (e.g., distances of objects in the captured area), as will be known by those skilled in the art.

In some embodiments, the images or video captured by the camera may be displayed on visual display 130 even when the user is not presently capturing images or recording videos to be stored, thereby allowing the user to view the area that is being captured by the camera on the display. Accordingly, the device 14 may overlay or dispose certain graphical objects over the displayed camera feed, as will be discussed more below. In addition, the cameras may each include a camera flash, such as camera flash 124 which is shown in FIG. 4 to be primarily for use with rear-facing camera 122; however, such camera flash 124 or other camera flashes (not shown) may be used for other purposes such as for providing light in dark or low-light environments or providing a warning or other indicator to gain the attention of nearby persons.

Handheld mobile device 14 also includes a number of user-device interfaces that provide users of the mobile device with a means of providing and/or receiving information. As used herein, the term "user-device interface" broadly includes any suitable form of electronic device, including both hardware and software components, which is located on the device and enables a user of the device to communicate with the device and/or vice versa. Such examples of user-device interfaces include indicator 126, visual display (or touchscreen) 130, microphone 132, speaker 134, and pushbutton(s) 136. Indicator 126 may be one or more light indicators, such as light emitting diodes (LEDs), and, in some embodiments, may be located on a front-face of the device 14, as shown in FIG. 3. The indicator may be used for numerous purposes, such as to indicate to an operator of device 14 that there is a new notification on the device. Visual display or touchscreen 130 is, in many embodiments, a graphics display, such as a touchscreen located on the front face of the device 14, as shown in FIG. 3, and can be used to provide a multitude of input and output functions. Microphone 132 provides audio input to the device 14 to enable the user to provide voice commands and/or carry out hands-free calling via the wireless carrier system 70. Speaker 134 provides audio output to a vehicle occupant and can be a dedicated, stand-alone system or part of the primary device audio system. The pushbuttons 136 (only one shown) allow manual user input to provide other data, response, or control input. Other pushbuttons may be located on the device 14, such as a lock button on the side of the device 14, up and down volume controls, camera buttons, etc. Additionally, as those skilled in the art will appreciate, the pushbutton(s) do not need to be dedicated to a single functionality of the device 14, but may be used to provide interfacing means for a variety of different functionality. Various other vehicle user interfaces can also be utilized, as the interfaces of FIGS. 2-4 are only an example of one particular implementation.

The handheld mobile device 14 can include image processing techniques that can be used to recognize one or more objects that are in the field of view of cameras 120 and/or 122. Such techniques may be known to those skilled in the art, and may include recognizing vehicles, street signs, other signs (e.g., building signs), traffic signals, pedestrians, sidewalks, roadways, and/or other objects within the field of view of the cameras.

Also, the handheld mobile device 14 can include a vehicle-reservation application that can be used to provide a vehicle-reservation interface, which can present the user (or vehicle operator) with an augmented video feed that can be used to show the user preferred pickup locations and/or allow the user to select a pickup location. Once selected, the device 14 can take a picture (i.e., record image data) of the selected pickup location and commit the image data to memory (e.g., store in memory 104). Thereafter, the user can confirm the pickup location and, in response thereto, the handheld mobile device 14 can send a vehicle pickup selection message to a remote server, such as a server at remote facility 80 or computer 78. The vehicle pickup selection message can include the image data obtained by the camera 122 and/or other identifying information such as geographical coordinates.

In one embodiment, a vehicle reservation request may be sent by the mobile device to the remote server and the vehicle reservation request may include a reservation location, such as a point of interest, intersection, an address, or geographical coordinates of the user's device upon generation of the reservation. The remote facility can then receive the reservation request and determine whether there are predefined preferred pickup locations at and/or near the reservation start location as specified in the vehicle reservation request. If so, the remote server can generate a pickup location response message from the remote server. The pickup location response message can include identifying information of one or more preferred pickup locations and the identifying information can include one or more visual cues identifying the one or more preferred pickup locations.

For example, the identifying information can include image data for each of the preferred pickup locations (e.g., an image of a street sign or other identifiable marker that can be used to identify the particular preferred pickup location). Then, the device 14 may use image processing techniques to identify preferred pickup locations. For example, through image processing techniques the device 14 can use the received identifying information along with presently obtained video/image data to identity the preferred pickup locations on the visual display, which can display the camera feed. Then, the device 14 can generate or obtain graphics to be overlaid, disposed, superimposed, or otherwise displayed on the displayed camera feed such that the graphics identify the preferred pickup locations. The user may then select a particular preferred pickup location by touching the overlaid graphic on the touchscreen 130, or the user selection may be made using other user-device interfaces.

In many embodiments, the graphics that are displayed on the camera feed or video feed can be associated with an object in the field of view of the camera feed or may be associated with a location that corresponds to the information represented in the graphic. For example, the identifying information can include an image (e.g., a picture) or identifier (e.g., text) of a street sign and, therefore, the device 14 can use this identifying information and image data obtained by camera 122 to determine an object in the field of view of the camera position that corresponds to the image or identifier. The device 14 can then generate and place a graphic over or around the object in the camera feed thereby providing an "augmented reality" (AR) view. In one embodiment, the identifying information can be image data (e.g., a picture), which can be compared to images received by camera 122 to thereby recognize the corresponding object in the camera feed displayed on display 130. In another embodiment, the identifying information can be text of a building or street sign (e.g., "Main St.") along with an object type (e.g., "street sign") and, thus, the device 14 can process obtained image data from camera 122 to search for a street sign that reads "Main St." Upon recognition of the street sign (or other object depending on the identifying information), the device 14 can overlay a graphic to highlight a preferred pickup location thereby providing an augmented reality view that can enable the user to make a more informed selection of the vehicle pickup location.

In some embodiments, the graphics that are generated may be presented on a touchscreen 130 and may be configured to perform an operation upon a user pressing or clicking on the region or area of the screen in which the graphic is displayed. For example, when a user touches an area on touchscreen 130 where a graphic is displayed, detailed information pertaining to that graphic (or object that it represents) can be obtained and/or presented on touchscreen 130 or otherwise presented to the user, such as via speaker 134 or other user device interface. Or, upon the user touching an area or graphic on the touchscreen, the device 14 can set the area corresponding to where the user touched to the selected pickup location. Device 14 can also present the user with a confirmation message before sending a vehicle pickup selection message to the remote server to confirm the vehicle pickup selection.

Figure 5:
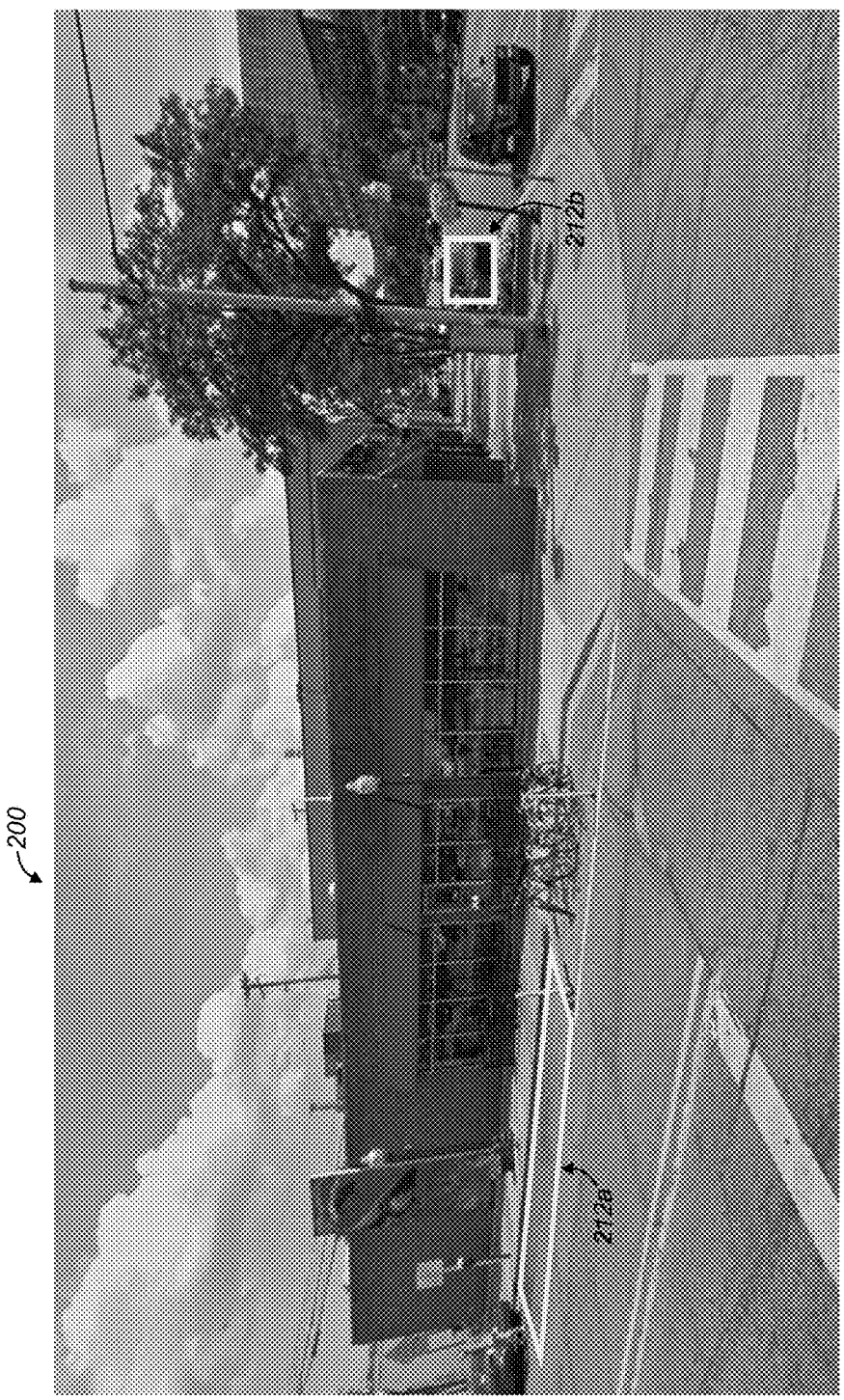
FIG. 5 is a block diagram illustrating an embodiment of presenting graphics on a displayed camera feed of a mobile device as to indicate preferred or potential pickup locations.

With reference to FIG. 5, there is shown a scenario that a user may encounter when using handheld mobile device 14 to locate nearby vehicles to potentially reserve. FIG. 5 provides an illustration of the video or camera feed 200 with overlaid graphics that may be displayed upon touchscreen 130 of mobile device 14. It should be appreciated that in the illustrated embodiment, the mobile device 14 may be rotated 90 degrees such that the user may view the camera feed in a landscape manner, as opposed to a portrait manner. FIG. 5 shows two preferred pickup location graphics 212a,b that may be selected by the user. As illustrated, vehicle graphics 212a and 212b are quadrangle-shaped graphics that represent certain potential pickup locations, but any type of graphical object, shapes, colors, or images may be used.

Figure 6:
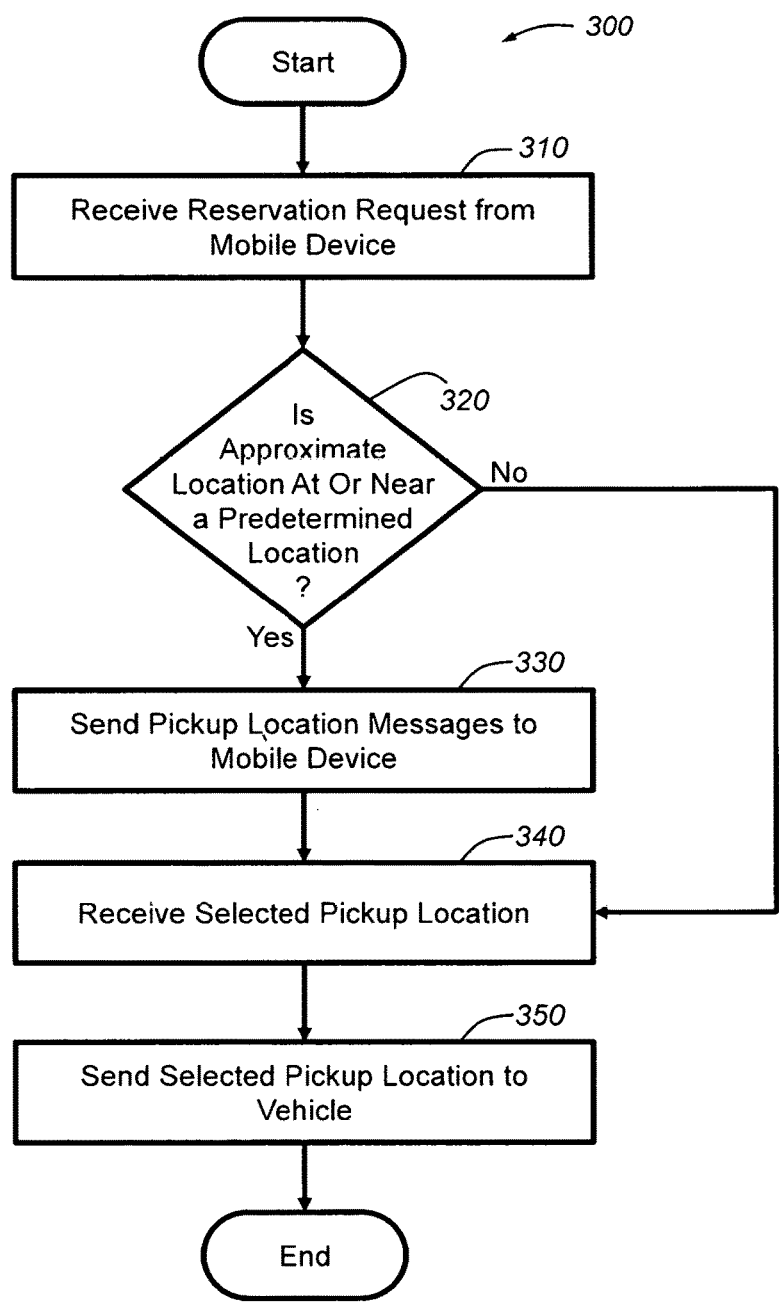
FIG. 6 is a flowchart illustrating an embodiment of a method of enabling a user to select a location for vehicle pickup.

With reference to FIGS. 6 and 7, there is shown an embodiment of a method 300 and 400 of enabling a user to select a location for vehicle pickup. Method 300 of FIG. 6 may be carried out by one or more remote servers such as a server at remote facility 80 or computer 78. Method 400 of FIG. 7 includes an embodiment of the method that may be carried out by a handheld mobile device, and includes various steps that correspond to those of method 300.

The method 300 begins with step 310, where a vehicle reservation request is received. The vehicle reservation may be generated and/or sent by a mobile device (see step 410 of method 400), and may specify a particular vehicle to reserve. In other embodiments, the reservation request may specify certain vehicle parameters and the remote server may select a vehicle for the reservation. Additionally, the reservation request can include or specify a start location for the reservation, such as a street address. This start location may be referred to as a reservation start location and may serve as a starting reference point for determining one or more preferred pickup locations for the reservation, as discussed below. In other embodiments, a reservation start location may not be specifically contained in the reservation request, but can be obtained based on information in the reservation request. The method 300 continues to step 320.

In step 320, the remote server determines whether one or more preferred pickup locations are located at or near the reservation start location. This determination can be made by querying one or more databases based on the reservation start location, which can be done by searching for preferred pickup locations that are within a predetermined distance of the reservation start location or that are at or near the reservation start location (e.g., at the same address as the location). In another embodiment, the remote server can determine one or more preferred pickup locations based on the reservation start location and other information pertaining to the reservation start location, such as street layouts, parking areas, present or anticipated vehicle traffic, satellite imagery, previously specified/selected pickup locations, etc. If it is determined that there are one or more preferred pickup locations located at or near the location, then the method 300 continues to step 330; otherwise, the method 300 continues to step 340.

In step 330, when it is determined that one or more preferred pickup locations are located at or near the reservation start location, the remote server sends one or more pickup location messages to a mobile device of the user. The message(s) can be sent to mobile device 14 via land network 76 and cellular carrier system 70. In one embodiment, the one or more pickup location messages include one or more visual cues identifying the one or more preferred pickup locations. Each preferred pickup location can be associated with one or more visual cues and each of the visual cues can be image data (e.g., pictures, video) that represents a preferred pickup location or may be image data of objects that may be used by device 14 to locate a preferred pickup location. In other embodiments, a single visual cue can be used to locate more than one preferred pickup location. As mentioned above, the visual cues need not necessarily be image data, but may be other data that can be used by device 14 to identify a preferred pickup location through use of camera 120 and/or camera 122. For example, an alphanumeric string and an object type can be specified in the pickup location messages, which can be used to identify an object within a camera feed that may be displayed on the camera, as discussed more below in steps 430-440 of method 400. The method 300 continues to step 340.

In step 340, the remote server receives a vehicle pickup selection message. The vehicle pickup selection message can be received from the mobile device 14 via cellular carrier system 70 and/or land network 76. The vehicle pickup selection message can include geographical coordinates of the pickup location and/or other geographic information that can be used to identify the selected pickup location. In another embodiment, the vehicle pickup selection message can specify a particular preferred pickup location (e.g., such as one of those sent to the mobile device in step 330). Or, the vehicle pickup selection message can include image data that contains an image of the selected pickup location. The method 300 then continues to step 350.

In step 350, a vehicle pickup guidance message is sent to the vehicle. The vehicle pickup guidance message can be sent to the vehicle via land network 76 and/or cellular carrier system 70. The vehicle pickup guidance message can be the same message as the vehicle pickup selection message that was received in step 340. Or, the vehicle pickup guidance message can include any or all information that was contained in the vehicle pickup selection message, such as geographical coordinates or image data, as discussed above.

When the vehicle receives the vehicle pickup guidance message, the vehicle can use information contained in this message to navigate to the selected pickup location. For example, vehicle 12 can use the reservation location to go to a general location, such as a particular address. Upon nearing the reservation start location, the vehicle can use particular information contained in the vehicle pickup guidance message to further guide the vehicle to the particular pickup location as specified by the user. For example, the vehicle can use image data received in the vehicle pickup guidance message along with live image data from camera 24 to guide the vehicle to the selected pickup location. The vehicle can compare the live image data received by a camera 24 (that is installed on the front of the vehicle) to the received image data and can then steer or drive the vehicle to the selected pickup location based on the results of the comparison(s). In one embodiment, the vehicle may be autonomous and may drive itself to the selected pickup location based on the information in the vehicle pickup guidance message and/or reservation information (any of which may be received by the vehicle). The method 300 then ends.

With reference to FIG. 7, there is shown an embodiment of a method 400 of enabling a user to select a location for vehicle pickup, wherein the method is carried out by a handheld mobile device. The method 400 can be carried out by mobile device 14 and many of the method steps may correspond to those steps of method 300, as discussed above.

Method 400 begins with step 410, wherein a vehicle reservation request is sent to a remote server. The vehicle reservation request can be sent by the mobile device using a vehicle-reservation application, or may be sent by a computer 78. The remote server can be another computer 78 or a server at remote facility 80, and the request may be sent via cellular carrier system 70 and/or land network 76. The reservation request message can include various reservation parameters, including certain vehicle parameters (e.g., vehicle type, number of passenger seats) and/or specific reservation time ranges. The reservation request message can also include a reservation start location, which can be represented be a street address, geographical coordinates, or an establishment name. The method 400 continues to step 420.

In step 420, a response message is received from the remote facility. The response message may be received in response to sending the vehicle reservation request (step 410) and can be received via land network 76 and/or cellular carrier system 70. The response message can be a reservation confirmation message that acts to confirm the reservation and/or provide other information regarding the reservation such as information identifying the vehicle that has been reserved and/or the reserved vehicle's present location. In other embodiments, the response message can be a pickup location response message that is received from the remote server and which may be that same message sent in step 330 of method 300. As mentioned above, the pickup location response message can include various information, including visual cues that correspond to one or more preferred pickup locations. The method 400 continues to step 430.

In step 430, a camera feed is displayed on the display of the mobile device. For example, the handheld mobile device 14 can use cameras 120 and/or 122 to capture image data and then may display the image data on display 130. As used herein, a "camera feed" is a live or nearly-live set of image/video data that is being presently captured by a camera. The camera feed may be presented on the touchscreen 130 of camera 24 and may include various other graphics overlaid on top of the camera feed, such as certain buttons or other input/interface objects. The method 400 continues to step 440.

In step 440, for each of the one or more preferred pickup locations, the device identifies (or attempts to identify) a corresponding area of the camera feed that corresponds with the preferred pickup location based on the associated visual cue(s). Although step 440 may be carried out according to various embodiments of method 400, step 440 may prove particularly useful when the remote server has identified one or more preferred pickup locations that correspond to the reservation start location (see steps 320-330 of method 300). Thus, in some embodiments where the remote server has not identified one or more preferred pickup locations, step 440 may be skipped.

Once the handheld mobile device 14 receives the pickup location response message, the device 14 can generate one or more corresponding graphics for each preferred pickup locations. Or, the pickup location response message may include such graphics. In any event, the graphics can be generated, modified, and/or manipulated such that the graphics each identifies a particular area in which the user may be picked up thereby augmenting the camera feed to provide an augmented reality (AR) view to the user. The device 14 can use various image processing techniques that can be used to find object(s) corresponding to the visual cues included in the pickup location response message and, upon finding the one or more object(s), the device 14 can render the one or more graphics in the appropriate location on the visual display and overlaid upon the camera feed. The method 400 then continues to step 450.

In step 450, a vehicle pickup selection from a user is received. The vehicle pickup selection can be received via a user touching a graphic (or area thereabout) on the touchscreen 130 of the mobile device 14. Or, the selection may be received through various other user device interfaces, such as through any of those discussed above. In a scenario where preferred pickup locations are received (at step 420), the device 14 may limit the user's selection to the preferred pickup locations. Once the selection is received, the method 400 proceeds to step 460.

In step 460, it is determined whether the selected location is a preferred pickup location. In some embodiments, this step may be particularly useful when the remote server has identified one or more preferred pickup locations that correspond to the reservation start location (see steps 320-330 of method 300). The device 14 may make this determination based on whether the user selected a graphic that represents a preferred pickup location (see step 440) or whether the user touched a portion of the touchscreen 130 that depicts an area that is close or near to a preferred pickup location. The method 400 continues to step 480 if a preferred pickup location is selected; otherwise the method 400 continues to step 470.

In step 470, image data is obtained from the camera of the handheld mobile device. The image data can be image data depicting the area that the user selected as a pickup location in step 450. In other embodiments, the device 14 may automatically capture one or more images and/or direct the user to take one or more images of the pickup location. The image data may be stored in memory 104. It should be appreciated that in some embodiments, such as the illustrated embodiment of method 400, step 470 may be skipped if the selected pickup location is a preferred pickup location. In such a scenario, step 470 may be skipped since the remote server may already have image data of the preferred pickup location; however, in some embodiments step 470 may still be carried out even though the selected pickup location is a preferred pickup location. The method 400 continues to step 480.

In step 480, a vehicle pickup selection message is sent to the remote server. The vehicle pickup selection message can include information pertaining the selected preferred pickup location (if a preferred pickup location was selected (see step 460)) or the image data captured in step 470. The message can be sent to the remote server via cellular carrier system 70 and/or land network 76.

As discussed above, the information contained in the vehicle pickup selection message can be then forwarded on to the reserved vehicle via a vehicle pickup guidance message. The vehicle can then use this information so that it can navigate to the selected pickup location and, in some embodiments, can use the captured image data to more accurately navigate or guide an operator to the particular selected pickup location. The vehicle 12 may be an autonomous vehicle and may be configured to autonomously drive to the selected pickup location upon receiving a message that includes information used to identify the selected pickup location, such as a vehicle pickup guidance message. The method 400 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of enabling a user to select a location for vehicle pickup, wherein the method is carried out by a handheld mobile device, and wherein the method comprises:
   obtaining vehicle reservation information pertaining to a vehicle reservation, wherein the vehicle reservation information includes a reservation start location;
   sending a vehicle reservation request to a remote server;
   receiving a pickup location response message from the remote server, wherein the pickup location response message includes identifying information of one or more preferred pickup locations, and wherein the identifying information is associated with one or more visual cues identifying the one or more preferred pickup locations;
   displaying a camera feed on a visual display of the mobile device, wherein the camera feed is video data that is obtained by a camera included on the mobile device;
   for each of the one or more preferred pickup locations included within a field of view of the camera, identifying a corresponding area of the camera feed that corresponds with the preferred pickup location and displaying a graphic over the camera feed in the corresponding area of the camera feed;
   receiving a vehicle pickup selection from a user, wherein the vehicle pickup selection corresponds to one of the preferred pickup locations and is generated by a user selecting an area for pickup that is within the field of view of the camera; and
   sending a vehicle pickup selection message to the remote server, wherein the vehicle pickup selection message includes the vehicle pickup selection.

2. The method of claim 1, wherein the vehicle reservation request is used to generate a reservation of a vehicle, wherein the vehicle reservation request specifies or includes the reservation start location, and wherein the reservation start location is a present location of the user or a general location in which the user has specified as a start location for the reservation.

3. The method of claim 1, wherein the remote facility is configured to send a vehicle pickup guidance message to the vehicle, wherein the vehicle pickup guidance message includes visual information of the selected pickup location, and wherein the vehicle is configured to:
   capture image data of an area in front of the vehicle; and
   compare the captured image data of the area in front of the vehicle to the visual information to guide the vehicle to the selected pickup location.

4. The method of claim 1, further comprising the step of, in response to the receiving step, capturing image data using the camera.

5. The method of claim 4, wherein the vehicle pickup selection message includes the captured image data.

6. The method of claim 5, wherein the remote server is configured to:
   receive the vehicle pickup selection message; and
   in response to receiving the vehicle pickup selection message, send a vehicle pickup guidance message to the vehicle.

7. The method of claim 6, wherein the vehicle pickup guidance message includes the captured image data and wherein the vehicle is configured to use the captured image data to identify the selected pickup location through comparing the received image data to image data obtained by one or more cameras installed on the vehicle.

8. The method of claim 1, wherein the vehicle is an autonomous vehicle that is configured to autonomously drive to the selected pickup location upon receiving a message that includes information used to identify the selected pickup location.

9. A method of enabling a user to select a location for vehicle pickup, wherein the method is carried out by a handheld mobile device, and wherein the method comprises:

sending a vehicle reservation request to a remote server, wherein the vehicle reservation request is used to generate a reservation of a vehicle, wherein the vehicle reservation request specifies or includes a reservation start location, and wherein the reservation start location is a present location of the user or a general location in which the user would like to be picked up by the vehicle;

after sending the vehicle reservation request, receiving a pickup location response message from the remote server, wherein the pickup location response message includes identifying information of one or more preferred pickup locations, and wherein the identifying information includes one or more visual cues identifying the one or more preferred pickup locations;

displaying a camera feed on the visual display of the mobile device, wherein the camera feed is video data that is obtained by a camera included on the mobile device;

for each of the one or more preferred pickup locations, identifying a corresponding area of the camera feed that corresponds with the preferred pickup location based on the associated visual cue(s);

for each of the one or more preferred pickup locations, displaying a graphic over the camera feed in the corresponding area of the camera feed;

receiving a vehicle pickup selection from a user, wherein the vehicle pickup selection is generated by a user selecting an area for pickup that is within a field of view of the camera; and sending a vehicle pickup selection message to the remote server, wherein the vehicle pickup selection message includes the vehicle pickup selection.

10. The method of claim 9, wherein the vehicle pickup selection corresponds to one of the preferred pickup locations.

11. The method of claim 10, wherein the remote facility is configured to send a vehicle pickup guidance message to the vehicle, wherein the vehicle pickup guidance message includes visual information of the selected pickup location, and wherein the vehicle is configured to:

capture image data of an area in front of the vehicle; and compare the captured image data of the area in front of the vehicle to the visual information to guide the vehicle to the selected pickup location.

12. The method of claim 9, further comprising the step of, in response to receiving the vehicle pickup selection from the user, capturing image data using the camera, and wherein the vehicle pickup selection message includes the captured image data.

13. The method of claim 12, wherein the remote server is configured to:

receive the vehicle pickup selection message; and send a vehicle pickup guidance message to the vehicle.

14. The method of claim 13, wherein the vehicle pickup guidance message includes at least part of the captured image data and wherein the vehicle is configured to use the received image data to identify the selected pickup location through comparing the received image data to image data obtained by one or more cameras installed on the vehicle.

15. The method of claim 9, wherein the vehicle is an autonomous vehicle that is configured to autonomously drive to the selected pickup location upon receiving a message that includes information used to identify the selected pickup location.

* * * * *